(12) United States Patent
Nonaka et al.

(10) Patent No.: US 6,335,599 B1
(45) Date of Patent: Jan. 1, 2002

(54) ACTUATOR FOR A DRIVE MODE SHIFTING DEVICE

(75) Inventors: Noriaki Nonaka, Chiryu; Tsukasa Iida, Nagoya; Mutsuroh Aoyama, Toyota, all of (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/609,716

(22) Filed: Jun. 30, 2000

(30) Foreign Application Priority Data

Jun. 30, 1999 (JP) .......................................... 11-186752

(51) Int. Cl.[7] .......................................... B60K 17/344
(52) U.S. Cl. ........................ 318/430; 318/433; 180/233
(58) Field of Search ................................. 318/430, 431, 318/432, 433; 74/335, 337.5; 180/233, 247; 477/34, 35, 36

(56) References Cited

U.S. PATENT DOCUMENTS

| 4,846,010 A | * | 7/1989 | Fujikawa et al. | .......... 74/337.5 |
| 4,854,413 A | * | 8/1989 | Kameda et al. | ............ 180/247 |
| 5,005,663 A | * | 4/1991 | Niide et al. | ................. 180/247 |
| 5,057,062 A | * | 10/1991 | Yamasaki et al. | .......... 475/221 |
| 5,522,776 A | * | 6/1996 | Alvey | ......................... 477/35 |

FOREIGN PATENT DOCUMENTS

JP          8-223983          8/1996

* cited by examiner

Primary Examiner—Bentsu Ro
(74) Attorney, Agent, or Firm—Finnegan, Henderson, Farabow, Garrett & Dunner, L.L.P.

(57) ABSTRACT

An actuator for a driving mode shifting device. A motor having a motor shaft which outputs rotational torque according to electrified electric current. An output member, which is moved by the rotational torque, shifts drive modes according to positions thereof. A torque transmitting mechanism transmits the rotational torque from the motor shaft to the output member. A control mechanism selects drive modes and controls the electric current to energize the motor so as to provide the selected drive mode. A one-way rotational mechanism is disposed between the motor shaft and the torque transmitting mechanism for preventing the motor shaft rotating against the motor. A rotational torque absorption mechanism is disposed between the one-way rotational mechanism and the torque transmitting mechanism for absorbing the rotational torque, when the motor shaft is rotated and the output member can not be moved. A rotational angle detecting means detects the rotational angle of the motor shaft.

11 Claims, 6 Drawing Sheets

ACTUATOR FOR A DRIVE MODE SHIFTING DEVICE

FIELD OF THE INVENTION

The present invention relates to an actuator for a drive mode shifting device for an automobile and, in particular, to the actuator for shifting drive modes, for example, between a two-wheel drive mode and a four-wheel drive mode.

BACKGROUND OF THE INVENTION

A conventional actuator for a driving mode shifting device is disclosed, for example, in Japanese Patent Laid-Open Publication No. H(Heisei) 8-223983. In this publication, the actuator for shifting drive modes between a two-wheel drive mode and a four-wheel drive mode is disclosed. The actuator includes a motor, a rod, a torque transmitting mechanism and a motor control mechanism. The motor outputs rotational torque according to an electric current. The rod can slide along the axis direction thereof so as to shift the drive modes. The torque transmitting mechanism changes the rotational torque to forwarding power (the propelling power), and transmits the forwarding power to the rod, when the motor is energized. The torque transmitting mechanism rotates the motor in the opposite direction by means of a reaction, which is received by the rod, when the motor is deenergized. The motor control mechanism fixes a predetermined period for providing electric current to the motor. When the motor has received more than the predetermined electric current, the motor control mechanism controls in the PWM (pulse width modulation) control so as to prevent the output torque from being more than a predetermined torque.

In this invention, the electric current to the motor is limited so as to control the output torque of the motor. Thus, the rod and the torque transmitting mechanism do not receive any great loads so that the torque transmitting mechanism and other parts become small.

However, in the above actuator, the predetermined period for providing electric current to the motor, is fixed. For example, the period is 1 second in the embodiment thereof. Therefore, even if the shifting drive mode between the two wheel drive mode and the four-wheel drive mode is not completely finished, the electric current is supplied for the predetermined period (1 second).

Further, in the above actuator, the two drive modes are shifted according to the positions of the rod. In detail, one end of the movable length of the rod is the two-wheel drive mode, and the other end of the movable length of the rod is the four-wheel drive mode. However, since the above actuator does not have a detecting means for detecting the position of the rod, the actuator is not acceptable for a complicated driving mode shifting. The complicated driving mode shifting device selects from three drive modes, for example, two-wheel drive mode, four-wheel drive mode (with the center differential system being locked) and four-wheel drive mode (with the center differential system being free).

In addition, in the above conventional actuator, the big rotational torque of the motor is essential to slide the rod, since the torque transmitting mechanism rotates the motor in the opposite direction by means of the reaction. Thus, for the purpose of a sure shifting of the drive mode, electric current to supply the motor is always controlled to make large torque. Accordingly, it is difficult to use a small motor so as not to prevent the motor from becoming overheated.

SUMMARY OF THE INVENTION

The invention has been conceived to solve the above-specified problems. According to the invention, there is provided an actuator for a driving mode shifting device comprising: a motor having a motor shaft which outputs rotational torque according to electric current; an output member, which is moved by the rotational torque, for shifting drive modes according to positions thereof; a torque transmitting mechanism for transmitting the rotational torque from the motor shaft to the output member; a control mechanism for selecting drive modes and for controlling the electric current to energize the motor so as to provide the selected drive mode; a one-way rotational mechanism disposed between the motor shaft and the torque transmitting mechanism for preventing the motor shaft rotating against the motor; a rotational torque absorption mechanism disposed between the one-way rotational mechanism and the torque transmitting mechanism for absorbing the rotational torque, when the motor shaft is rotated and the output member can not be moved; and a rotational angle detecting means for detecting the rotational angle of the motor shaft.

Other objects and advantages of invention will become apparent during the following discussion of the accompanying drawings.

BRIEF DESCRIPTION OF THE DRAWING FIGURES

The foregoing and additional features of the present invention will become more apparent from the following detailed description of embodiments thereof when considered with reference to the attached drawings, in which.

DETAILED DESCRIPTION OF THE PREFERRED EMBODIMENTS

An actuator for a driving mode shifting device in accordance with preferred embodiments of the present invention will be described with reference to the attached drawings.

Figure 1:
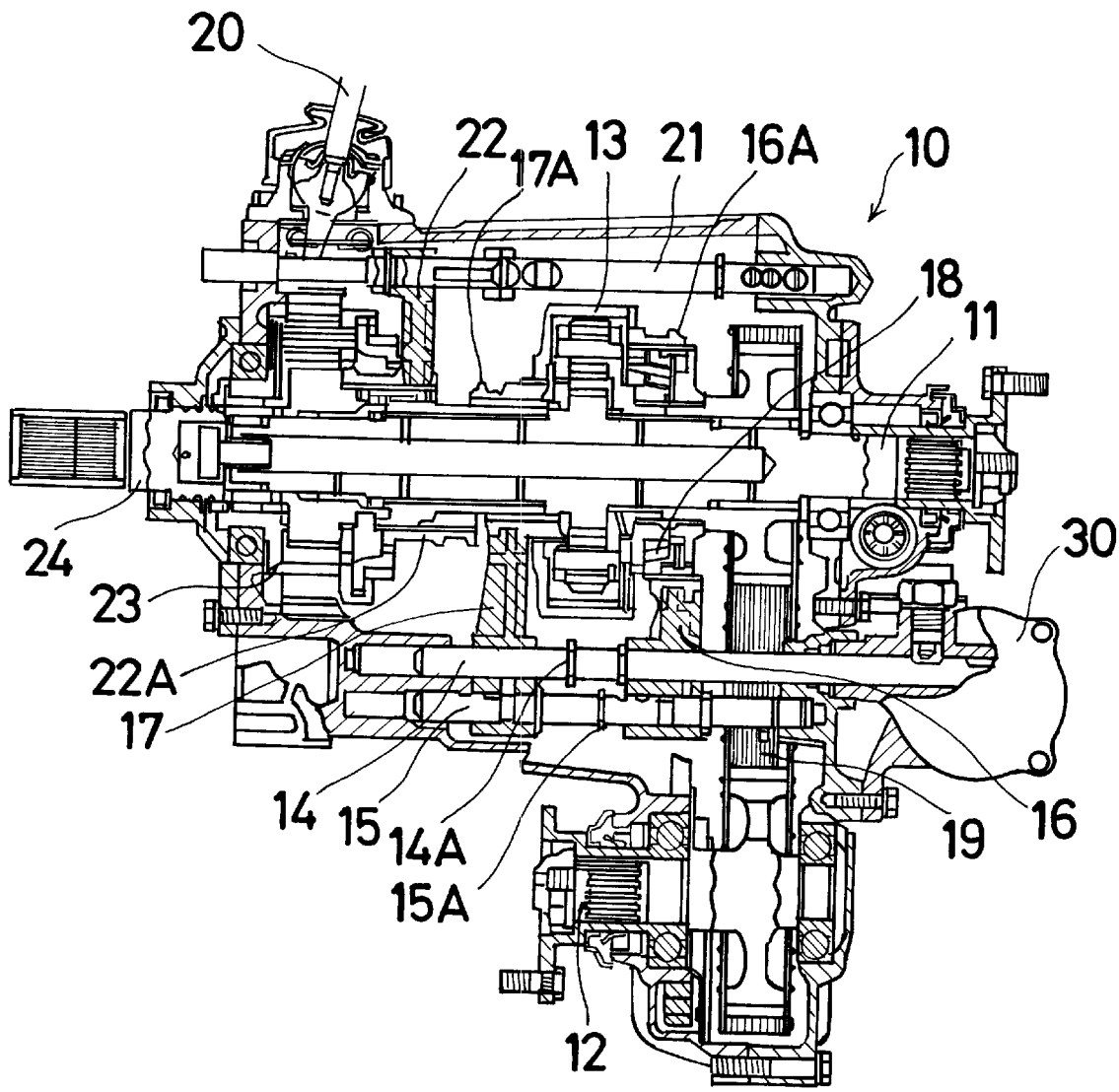
FIG. 1 is a vertical sectional view of an embodiment of a drive mode shifting device in accordance with the prevent invention.

FIG. 1 shows a vertical sectional view of a driving mode shifting device 10, which is shifted by an actuator for the driving mode shifting device. It will be understood that some of the hatching is not shown.

The driving mode shifting device 10 is disposed between an input shaft 24, a front-wheel driving shaft 12 and a rear-wheel driving shaft 11. The input shaft 24 is an output shaft of a transmitting apparatus (not shown). The driving mode shifting device 10 selects a driving mode between a two-wheel drive mode, a four-wheel drive mode (with the center differential system being locked) and a four-wheel drive mode (with the center differential system being free) by operations of an actuator 30 for driving the mode shifting device. Here, the driving mode shifting device 10 has a reduction gear 23, which can be manually selected between the hi-gear of the end reduction gear ratio and the low-gear of the end reduction gear ratio in four-wheel drive mode. In the driver's seat, there is a hi-low shift lever 20, which controls the reduction gear 23. The rear-wheel driving shaft 11 transmits the rotational torque from the input shaft 24. The rotational torque of the rear-wheel driving shaft 11 can be transmitted to the front-wheel driving shaft 12 via a center differential unit 13 and a silent chain 19. The center differential unit 13 has a planetary gear mechanism, which absorbs the rotational differential between the front-wheel driving shaft 12 and the rear-wheel driving shaft 11.

The driving mode shifting device 10 includes a first shaft 14, a second shaft 15, a shift fork 16, a center shift fork 17 and sleeves 16A, 17A. The first shaft 14 is connected with a rod 33 of the actuator 30. The rod 33 is an output member of the actuator 30. The second shaft 15 is located on a parallel with the first shaft 14. The shift fork 16 and the center shift fork 17 are slidably disposed between the first shaft 14 and the second shaft 15 so as to slide along the first shaft 14 and the second shaft 15 in a predetermined range. The shift fork 16 can shift the drive mode between the two-wheel drive mode and the four-wheel drive mode. Each of the sleeves 16A and 17A are located on one end of the shift forks 16 and 17 respectively. Regarding sleeve 17A as shown in FIG. 1, an upper side from the rear-wheel driving shaft 11 is shown at the free condition where the sleeve 17A does not engage with the center differential unit 13. On the other hand, a bottom side of the sleeve 17A from the-rear-wheel driving shaft 11 is shown at the lock condition where the sleeve 17A does engage with the center differential unit 13. Each of the first shaft 14 and the second shaft 15 has a plurality of large diameter portions 14A and 15A so as to control the predetermined range, where the shift fork 16 and the center shift fork 17 slide along the shafts 14 and 15.

The driving mode shifting device 10 can shift the drive modes between the two-wheel drive mode, the four-wheel drive mode (with the center differential system locked) and the four-wheel drive mode (with the center differential system free) in accordance with the positions of the rod 33 of the actuator 30. In detail, as the first shaft 14 is integrally connected with the rod 33, the first shaft 14 is slid in the axial direction of the first shaft 14 in accordance with the movement of the rod 33. Then, the first shaft 14 makes the shift fork 16 and the center shift fork 17 slide in the axial direction of the first shaft 14. As the sleeves 16A and 17A are slid, the drive mode is shifted. In the four-wheel drive mode (the center differential system free), since the center differential unit 13 connects with the front-wheel driving shaft 12, the driving torque of the rear-wheel driving shaft 11 transmits to the front-wheel driving shaft 12 via the center differential unit 13 and the silent chain 19. The planetary gear mechanism of the center differential unit 13 absorbs the rotational differential between the front-wheel driving shaft 12 and the rear-wheel driving shaft 11. In the four-wheel drive mode (with the center differential system locked), the sleeve 17 makes the planetary gear mechanism of the center differential unit 13 lock so as to engage between the front-wheel driving shaft 12 and the rear-wheel driving shaft 11. Thus, the front-wheel driving shaft 12 rotates with the same speed of revolution of the rear-wheel driving shaft 11. In the two-wheel drive mode, the center differential unit 13 is not connected with the front-wheel driving shaft 12. Therefore, the rotational torque of the input shaft 24 is only transmitted to the rear-wheel driving shaft 11.

Figure 2:
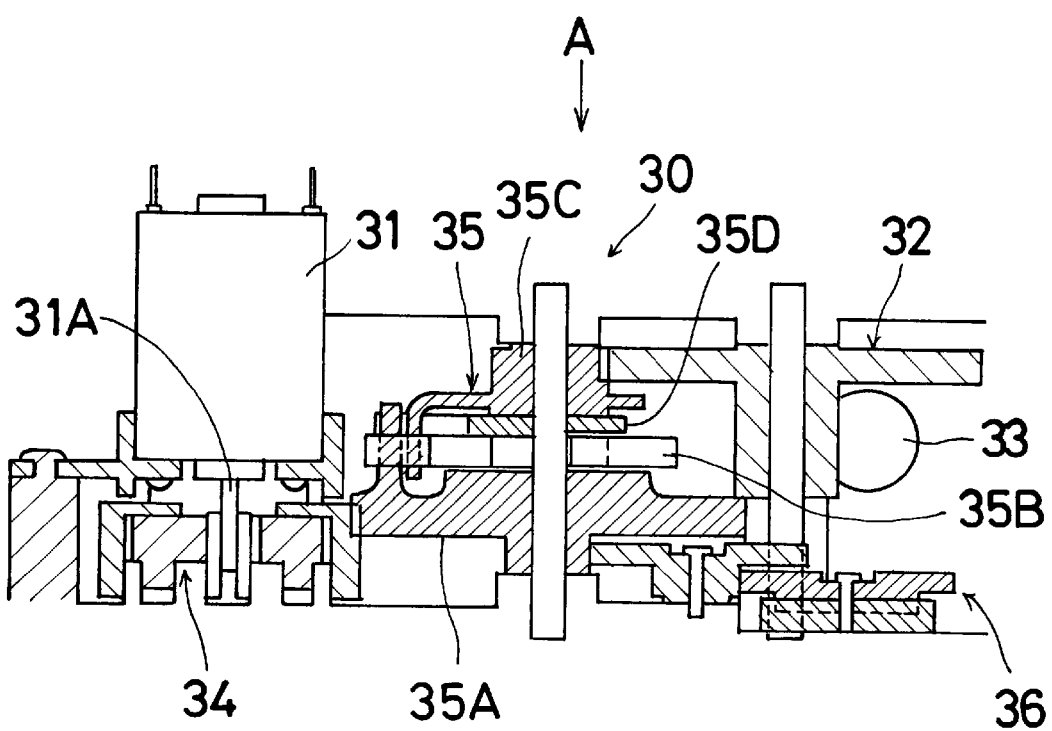
FIG. 2 is a cross-sectional view of the embodiment of FIG. 1, of an actuator for the drive mode shifting device.
Figure 3:
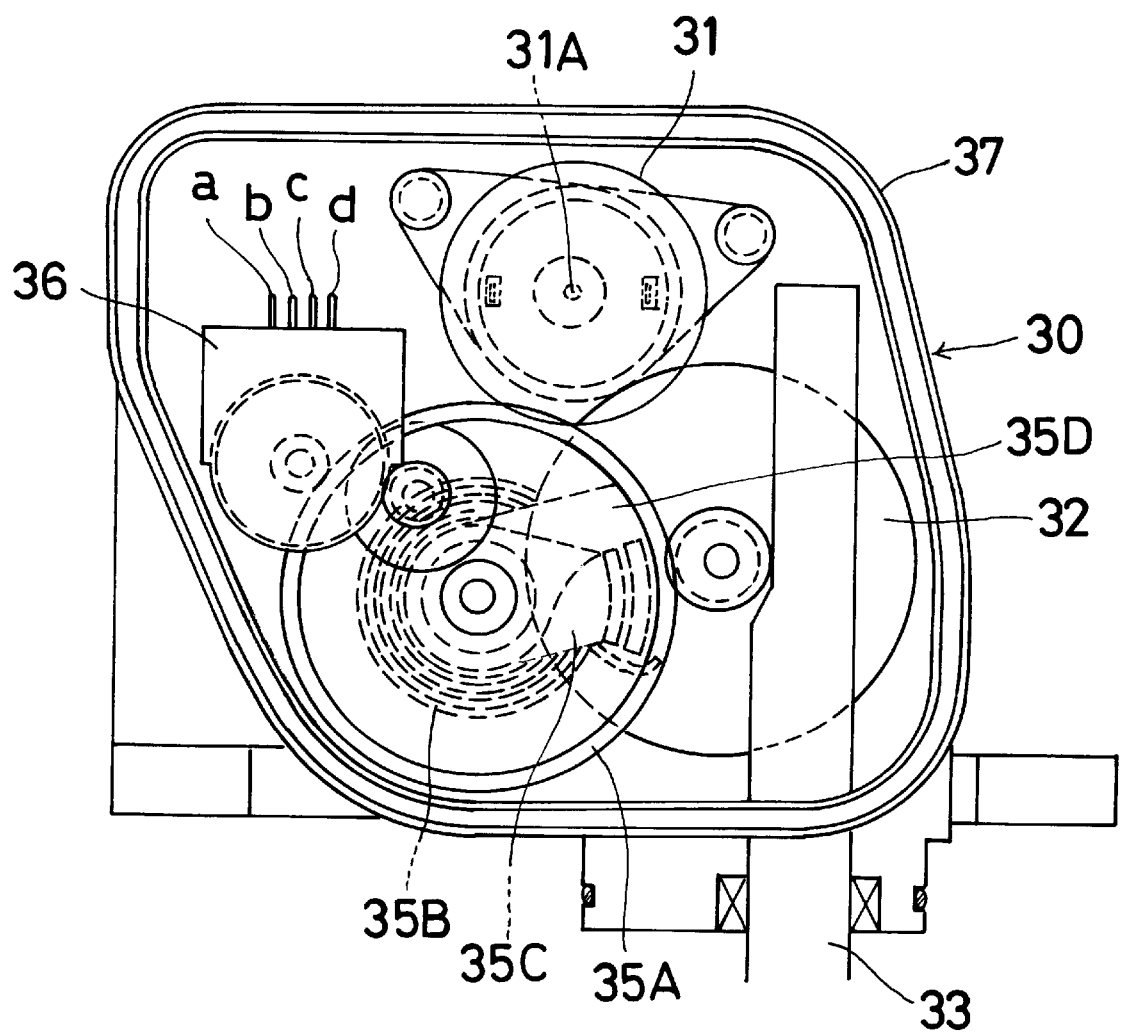
FIG. 3 is a direction schematic plan view of the embodiment of FIG. 2.
Figure 4:
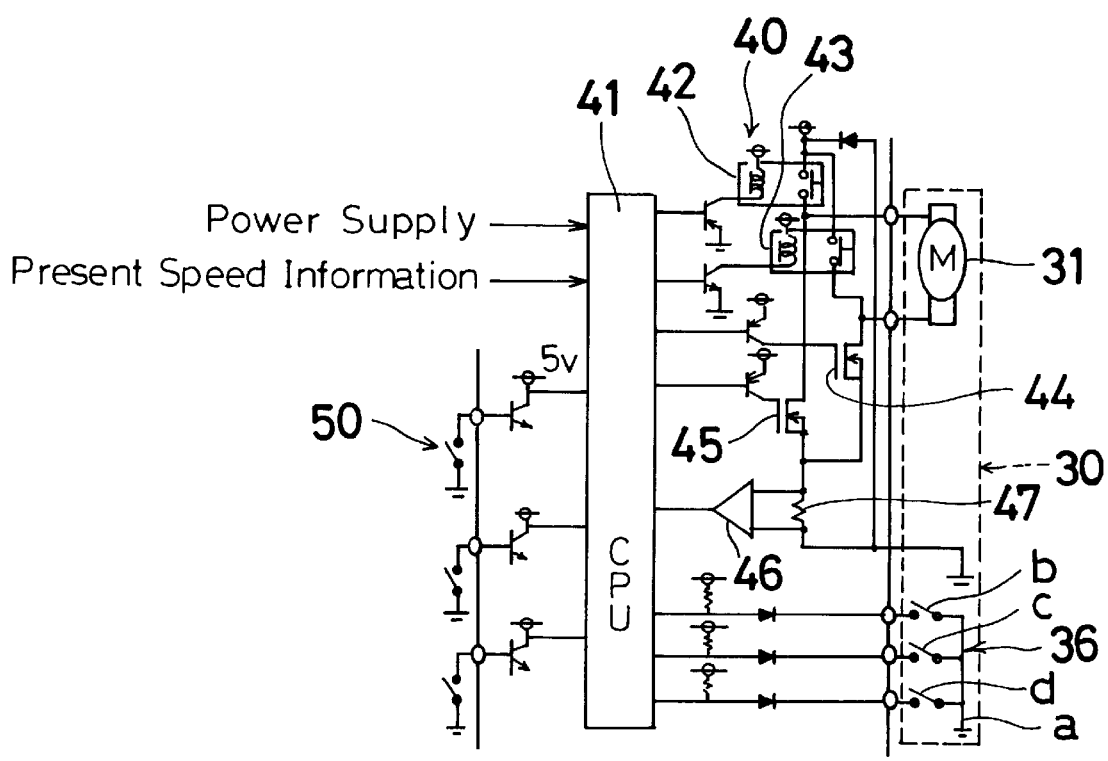
FIG. 4 is a connection diagram of the above embodiment of a control unit in accordance with the prevent invention.

As shown in FIGS. 2 and 3, the actuator 30 has a housing 37. In the housing 37, there are a motor 31, an output mechanism 32 as a torque transmitting mechanism, the rod 33, a cycloid gear 34 as a one-way rotational mechanism, a rotational absorbing mechanism 35 as a rotational torque absorption mechanism and a limit switch 36 as a rotational angle detecting means. The motor 31, which has a motor shaft 31A, is rotated according to an electric current. The output mechanism 32 changes the rotational torque of the motor shaft 31A into the propelling power of the rod 33. The rod 33 is slid in the axial direction by the propelling power. The cycloid gear 34 is located between the motor shaft 31A and the output mechanism 32 so as to be a reverse rotational preventing mechanism. The reverse rotational preventing mechanism prevents the motor shaft 31 A from rotating by means of the rotational torque, which is transmitted from the rod 33 to the motor shaft 31A. The rotational absorbing mechanism 35 is located between the cycloid gear 34 and the output mechanism 32. The rotational absorbing mechanism 35 absorbs the rotational torque of the motor 31, when the motor 31 rotates but the rod 33 can not slide. The limit switch 36 is located between the rotational absorbing mechanism 35 and the motor shaft 31A and detects the rotational angle of the motor shaft 31A. In addition, the actuator 30 has a controller 40 as a control mechanism (although not shown in FIGS. 2 and 3) which is located outside of the housing 37. The controller 40, which receives some signals regarding the driving condition, and which selects the driving mode, controls the electric current to energize the motor 31 so as to shift the driving mode. The circuit structure of the controller 40 is shown in FIG. 4.

The rotational absorbing mechanism 35 includes a motor side rotational member 35A, a spiral spring 35B, an output side rotational member 35C and a plate 35D. The motor side rotational member 35A engages with the cycloid gear 34 so as to receive the rotational torque from the motor shaft 31A. The output side rotational member 35C, which engages with the output mechanism 32, is rotatably disposed on the same axis of the motor side rotational member 35A. One end of the spiral spring 35B is fixed to the motor side rotational member 35A, and the other end thereof is fixed to the output side rotational member 35C. The spiral spring 35B is elastic in the rotational direction of the motor side rotational member 35A. The plate 35D is located between the motor side rotational member 35A and the output side rotational member 35C.

As shown in FIG. 3, the limit switch 36 has four terminals a, b, c and d. Each of the terminals a, b, c and d can output the contacting signal to the controller 40 so as to detect the rotational angle of the motor shaft 31A. Therefore, as shown in the following Table 1, the limit switch 36 detects the detail positions of the rod 33, which includes three driving modes and two intermediate portions between each of the driving modes. Table 1 shows the relationship between the contact states of the each terminals a through d and the driving mode states. Here, -Y- indicates that the terminal outputs the contact signal, and -N- indicates that the terminal does not output the contact signal.

TABLE 1

| Setting position of the driving mode | A | ↔ | B | ↔ | C |
|---|---|---|---|---|---|
| Setting position of the limit switch 36 | I | II | III | IV | V |
| Terminal a | Y | Y | Y | Y | Y |
| Terminal b | Y | Y | N | N | N |
| Terminal c | N | Y | Y | Y | N |
| Terminal d | N | N | N | Y | Y |

As shown in the above Table 1, according to variations of the contact states of the each terminals a though d, the setting positions I though V of the limit switch 36 can be detected. Then, as the relationship between the setting position A through C of the driving mode and the setting position I though V of the limit switch 36 is corresponded, the driving mode is detected. Here, the setting position A of the driving mode corresponds to the two-wheel driving mode, the setting position B thereof corresponds to the four-wheel drive mode (with the center differential system free) and the setting position C thereof corresponds to the four-wheel drive mode (with the center differential system locked). Further, the above limit -switch 36 can detect two intermediate positions between the setting positions A, B and C. The terminal a is the ground.

As shown in FIG. 4, the controller 40 has a CPU (central processing unit) 41, relays 42 and 43, an FET (field effect transistor) 44, an FET 45 and a manual switch 50. The CPU 41 receives the power supply from a battery (not shown), and also receives the present speed information of the vehicle and the selected position of the manual switch 50. The CPU 41 selects the appropriate driving mode based on the above information. On the other hand, the CPU 41 calculates the present driving mode based on the output signals of the terminals a though d. Then, if there is some difference between the appropriate driving mode and the present driving mode, the controller 40 controls the electric current to energize the motor 31, relays 42 and 43 and FETs 44, 45. As a result, the controller 40 makes the actuator 30 shift the driving mode from the present driving mode to the appropriate driving mode. With respect to the electric current of the motor 31, a comparator 46 compares the electric current of a resistance 47 with a predetermined electric current. As a result, the CPU 41 detects whether the electric current is the predetermined current or not.

Figure 5:
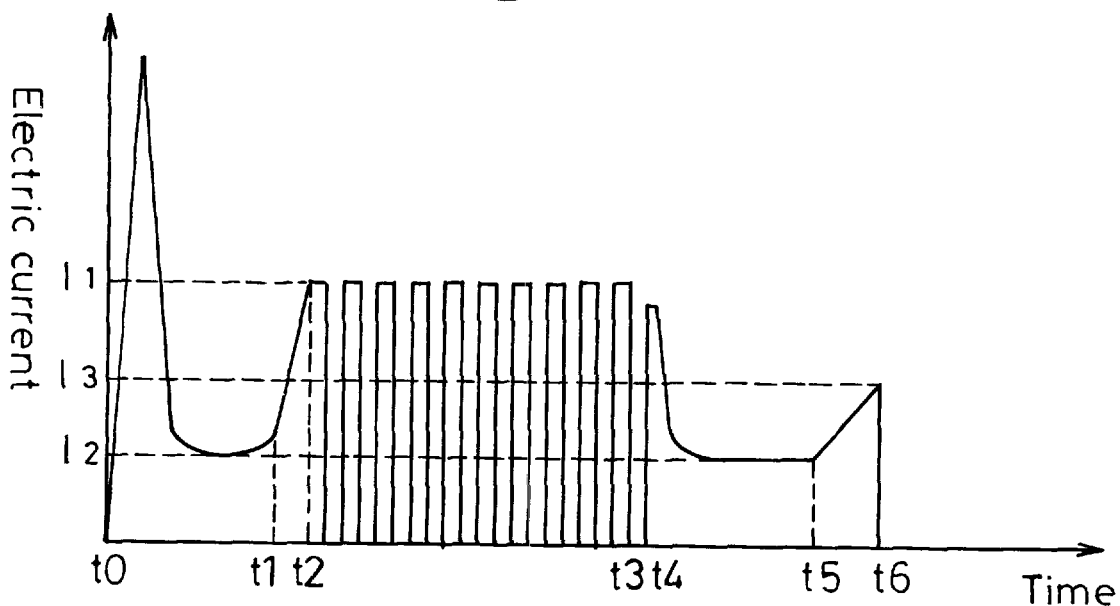
FIGS. 5 through 7 are time charts of the above embodiment in accordance with the present invention.
Figure 6:
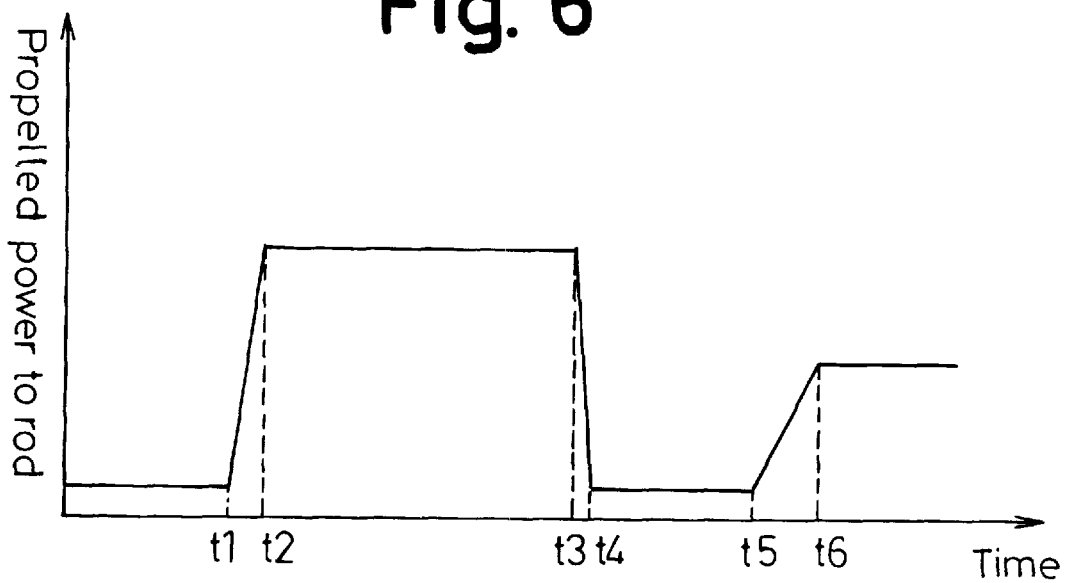
Figure 7:
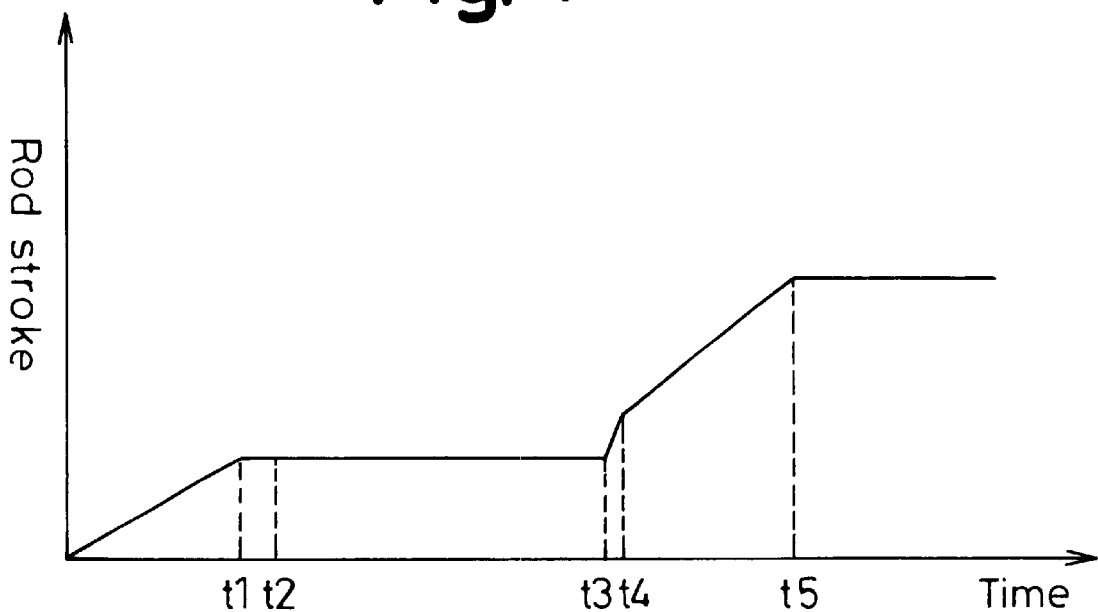

The operation of the actuator 30 will be explained with reference to FIGS. 5 though 7. In this embodiment, when the drive mode shifts from the four-wheel drive mode (with the center differential system free) to the four-wheel drive mode (with the center differential system locked), the operation of each member will be explained. FIG. 5 shows the relationship between the electric current to supply the motor 31 and the operational time. FIG. 6 shows the relationship between the propelling power to slide the rod 33 by the spiral spring 35B and the operational time. FIG. 7 shows the relationship between the stroke of the rod 33 and the operational time. At first, the operation in the operational time between t0 and t1 will be explained. When the driving mode is the four-wheel drive mode (the center differential system free), a center differential-locking switch of the manual switch 50 is turned on. Then, the CPU 41 outputs on-off signals of the relays 42, 43 and FETs 44, 45 so that the electric current is supplied to the motor 31 (the operational time; t0). Although there is a flash peak at electric current supplying, the square electric current I2 is supplied to the motor 31. Thus, the motor shaft 31A is rotated and the rotational torque of the motor shaft 31A is transmitted to the output mechanism 32 so that the rod 33 is slid in the axial direction thereof. The slide of the rod 33 is not prevented from restricting in operational time between t0 to t1. At the period, the rod 33 slides in proportion to the operational time. In addition, only the resistance in sliding contact between the members operates on the spiral spring 35B.

Next, the movement of the center shift fork 17 will be explained. The center shift fork 17 is able to slide in the axial direction of the rod 33 according to the stroke of the rod 33 so as to slide the sleeve 17A. The sleeve 17A has spline gears, which are disposed on the internal surface and the external surface. On the other hand, the center differential unit 13 has spline gears, which can engage with the gears of the sleeve 17A. When the spline gears of the center differential unit 13 engage with the spline gears of the sleeve 17A, the driving mode is the four-wheel drive mode (with the center differential system locked). Therefore, the planetary gear mechanism of the center differential unit 13 is integrally rotated with the input shaft 24. However, when the driving mode is the four-wheel drive mode (with the center differential system free), the planetary gear mechanism of the center differential unit 13 is operated (rotated). Thus, there is some possibility that the phase of the spline gears of the sleeve 17A does not correspond with the phase of the spline gears of the center differential unit 13. In this situation, the spline gears of the sleeve 17A can not engage with the spline gears of the center differential unit 13, although the center shift fork 17 receives the propelling power in the axial direction of the rod 33. In this embodiment, the rotational absorbing mechanism 35 has the spiral spring 35B so as to absorb the rotational torque (hereinafter, designated as "waiting condition"), which is transmitted from the motor side rotational member 35A. Therefore, the sliding of the center shift fork 17 waits for correspondence between the phases. As shown in FIGS. 5 through 7, the time period between the operational time t1 and t3 is the period of the waiting condition. In the waiting condition, gradually the electric current to energize the motor 31 begins to increase (until the operational time t2), since the motor 31 is rotated but the rod 33 is not slid. At that time, the rotational torque of the motor 31 is absorbed by the spiral spring 35B. The electric current to energize the motor 31 is detected by the comparator 46. The electric current attained is the first predetermined electric current I1 (the operational time t2) which means that the absorbing rotational torque of the spiral spring 35B is maximum. If so, the CPU 41 keeps the electric current at the first predetermined electric current I1 by means of the PWM control, and makes the ON-OFF control. Thus, this control prevents the motor 31 from becoming over-heated. Hereinafter, it is referred to as the duty control, which includes the PWM control and the ON-OFF control between the operational time t2 and t3 as shown in FIG. 5. Here, since the motor shaft 31A is engaged with the rotational absorbing mechanism 35 via the cycloid gear 34, it prevents the motor shaft 31A from rotating in the opposite direction, even if the motor 31 is deenergized. In addition, it is possible to make the ON-OFF control that the electric current supplies the motor 31 and does not supply the motor 31, continuously. It will be explained regarding the absorbing of the spiral spring 35B between the operational time t1 and t3. As the motor 31 rotates with absorbing the spiral spring 35B from the operational time t1 to the operational time t2 the load of the spiral spring 35B is increased in small increments. Then, the rotation of the motor 31 is stopped at the operational time t2. When the duty control is operated between the operational time t2 and t3 the motor 31 is not rotated and the spiral spring 35B keeps the maximum load of the spiral spring 35B.

The duty control is constant until the spline gears of the sleeve 17A engage with the spline gears of the center differential unit 13 that means until both of the phases of the spline gears are in correspondence with each other. After both of the phases of the spline gears are in correspondence with each other (the operational time t3), the sleeve 17A is slid along the spline gears.

The spiral spring 35B is changed from the absorbing condition to the normal condition between the operational time t3 and t4. Thus, the load of the spiral spring 35B becomes small (the operational time t4). Therefore, the rod 33 can be quickly slid in the axial direction thereof, since the absorbing load operates to the rod 33 with the rotational torque of the motor 31.

Between the operational time t4 and t5, the electric current is supplied to the motor 31 continuously. As the sleeve 17A slides along the spline gears of the center differential unit 13 in the axial direction, the rod 33 strokes in proportion of the time. At that time, the electric current 12, which is the same current between the operational time t1 and t2 is supplied to the motor 31.

Between the operational time t5 and t6, the sleeve 17A slides along the spline gears of the center differential unit 13 until the end portion of the driving mode shifting. After the operational time t5, the electric current grows gradually, as shown in FIG. 5. When the electric current to supply the motor 31, which is detected by the comparator 46, attains the first predetermined electric current 13 (the operational time t6), the CPU 41 stops supplying the electric current to the motor 31. At that time, the driving mode shifting from the four-wheel drive mode (with the center differential system free) to the four-wheel drive mode (with center differential system locked) is finished. On the other hand, the limit switch 36 detects the rotational angle of the motor shaft 31A so as to confirm the driving mode shifting is finished.

As described above, the actuator 30 in the embodiment detects the volume of the electric current, which supplies the motor 31, by means of the CPU 41, and the rotational angle of the motor shaft 31A by means of the limit switch 36. Therefore, before the rod 33 is slid, the CPU 41 can estimate the position of the rod 33 so that it is possible to shift the driving mode surely. In addition, if the spring constant of the spiral spring 35B is large, the actuator 30 can become small. Further, even if the ignition of the engine is once switched off, the CPU 41 detects the rotational angle of the motor shaft 31A and the selected portion of the manual switch 50. Thus, the CPU 41 can perceive the present driving mode so that the reliance of the driving mode shifting device 10 is improved.

Figure 8:
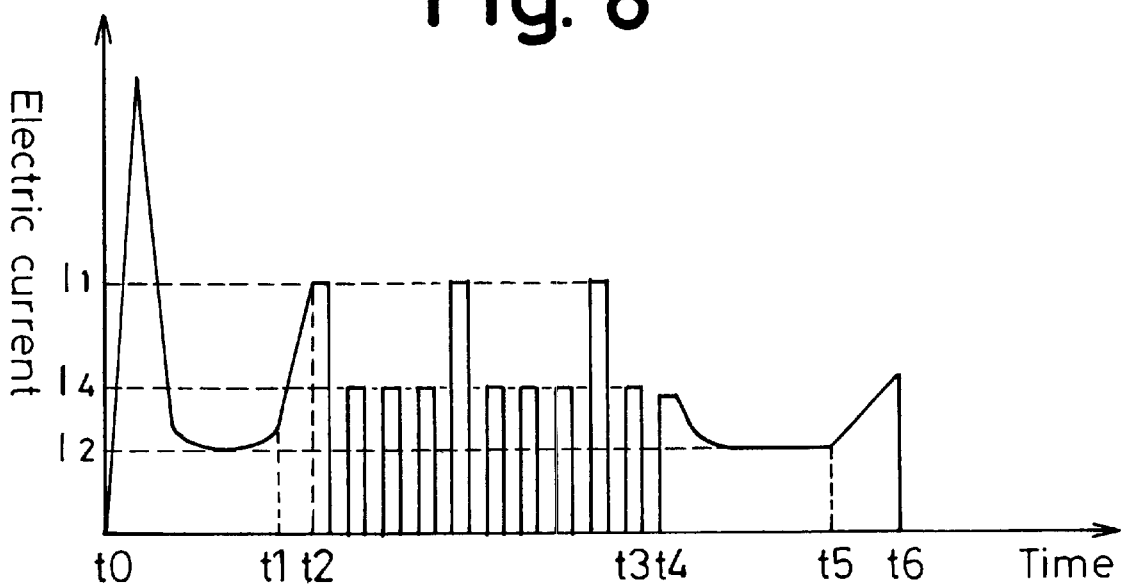
FIG. 8 is a time chart of another embodiment in accordance with the present invention.

FIG. 8, which shows the relationship between the electric current to supply the motor 31 and the operational time, is another time chart. However, FIG. 8 is similar to FIG. 5 except between the operational times t2 and t3. In this other embodiment, regarding the time chart of FIG. 8, the propelling power of the rod 33 and the stroke of the rod 33 are similar to FIG. 6 and FIG. 7 respectively. Therefore, only a part of the operation, which is between the operational time t2 and t3 will be explained.

When the electric current to energize the motor 31, which is detected by the comparator 46, attains the first predetermined electric current I1 (the operational time t2), the CPU 41 starts the duty control. In this embodiment, the proportion of ON period and OFF period is the same in FIG. 5. However, the volume of the electric current is different from that shown in FIG. 5.

The predetermined electric current I1 is supplied once (the operational time t2). Then, since the cycloid gear 34 prevents the motor shaft 31A from rotating in the opposite direction, the minimum electric current, which can make the rod 33 slide to engage between the spline gears of the sleeve 17A and the same of the center differential unit 13, is essential. Therefore, after the predetermined electrical current I1 is supplied one time, the predetermined electrical current 14, which is smaller than the predetermined electrical current I1, is supplied. As the predetermined electrical current 14 is the minimum electric current, the CPU 41 supplies the predetermined electrical current I1 in some interval. Therefore, even if the predetermined electric current 14 is too small to slide the sleeve 17A by means of the vehicle condition, for example, the frequency of the vehicle, the measurement error and so on, the sleeve 17A can be slid. In this embodiment, the duty control of the CPU 41 controls that the predetermined electric current 14 is supplied three times, then the predetermined electric current I1 is supplied one time. This duty control continued by the detected electric current becomes smaller than the predetermined electric current M. This means that the sleeve 17A slides to engage between the splines of the sleeve 17A and the center differential unit 13.

In this second embodiment, during the waiting condition the electrical current becomes small so as to prevent the motor 31 becoming overheated. Therefore, the small motor, which has a small capacity, can be used so that the actuator 30 becomes small.

In the above embodiments, the duty control controls the electric current in proposition of the electric current to supply the motor 31 so as to prevent the motor 31 from becoming overheated. However, instead of the above, it is possible that a temperature detecting means detects the temperature of the motor 31. If the temperature of the motor 31 becomes more than a predetermined temperature, the CPU 41 stops supplying the electric current to the motor 31.

In the above embodiments, as the spiral spring 35B of the rotational absorbing mechanism 35 is located, the actuator 30 becomes small. Further, as the rotational absorbing mechanism 35 prevents the motor shaft 31A from rotating in the opposite direction, the CPU 41 can supply the small electric current to the motor 31. In addition, the small motor 31 can be located so that the actuator 31 can become small.

What is claimed is:

1. An actuator for driving a mode shifting device, comprising:
   motor having a motor shaft which outputs rotational torque according to electric current;
   an output member, moved by the rotational torque, for shifting drive modes according to positions thereof;
   a torque transmitting mechanism for transmitting the rotational torque from the motor shaft to the output member;
   a control mechanism for selecting drive modes and for controlling the electric current to energize the motor so as to provide the selected drive mode;
   a one-way rotational mechanism disposed between the motor shaft and the torque transmitting mechanism for preventing the motor shaft rotating against the motor;
   a rotational torque absorption mechanism disposed between the one-way rotational mechanism and the torque transmitting mechanism for absorbing the rotational torque, when the motor shaft is rotated and the output member can not be moved; and
   a rotational angle detecting means for detecting the rotational angle of the motor shaft.

2. An actuator for a driving mode shifting device according to claim 1, wherein the control mechanism restricts the electric current when the motor achieves a predetermined condition one way in the driving mode shifting.

3. An actuator for a driving mode shifting device according to claim 2, wherein the one-way rotational mechanism includes a reduction gear, wherein the reduction gear is one selected from the group consisting of a cycloid gear and a worn gear.

4. An actuator for a driving mode shifting device according to claim 2, wherein the rotational torque absorption mechanism outputs the absorbed rotational torque to the output member, when the output member becomes movable.

5. An actuator for a driving mode shifting device according to claim 4, where in the rotational torque absorption mechanism includes:

a motor side rotational member receiving the rotational torque from the one-way rotational mechanism;

an output side rotational member outputting the rotational torque to the torque transmitting mechanism; and an elastic member, located between the motor side rotational member and the output side rotational member, and contracting thereof to the rotational direction of the motor side rotational member.

6. An actuator for a driving mode shifting device according to claim 2, wherein the rotational angle detecting means detects rotational positions of the motor shaft, which correspond with the driving modes and intermediate portions therebetween.

7. An actuator for a driving mode shifting device according to claim 6, wherein the rotational angle detecting means is a limit switch.

8. An actuator for a driving mode shifting device according to claim 2, wherein the predetermined condition is a condition that the electric current to energize the motor is a predetermined electric current.

9. An actuator for a driving mode shifting device according to claim 2, wherein the predetermined condition is a condition that a temperature of the motor is a predetermined temperature.

10. An actuator for a driving mode shifting device according to claim 2, wherein the control mechanism operates a duty control when the output member can not be moved.

11. An actuator for a driving mode shifting device according to claim 10, wherein the control mechanism outputs a first predetermined electric current and a second predetermined electric current, which is smaller than the first predetermined electric current, while the duty control is operated.

* * * * *

UNITED STATES PATENT AND TRADEMARK OFFICE
CERTIFICATE OF CORRECTION

PATENT NO. : 6,335,599 B1
DATED : January 1, 2002
INVENTOR(S) : Noriaki Nonaka, Tsukasa Iida and Mutsuroh Aoyama It is certified that error appears in the above-identified patent and that said Letters Patent is hereby corrected as shown below:

<u>Column 8,</u>
Line 31, "motor having" should read -- a motor having --.

Signed and Sealed this

Seventh Day of May, 2002

Attest:

Attesting Officer

JAMES E. ROGAN
Director of the United States Patent and Trademark Office